Sept. 24, 1929.  C. W. WEISS  1,728,949
UNIVERSAL JOINT
Filed April 26, 1927
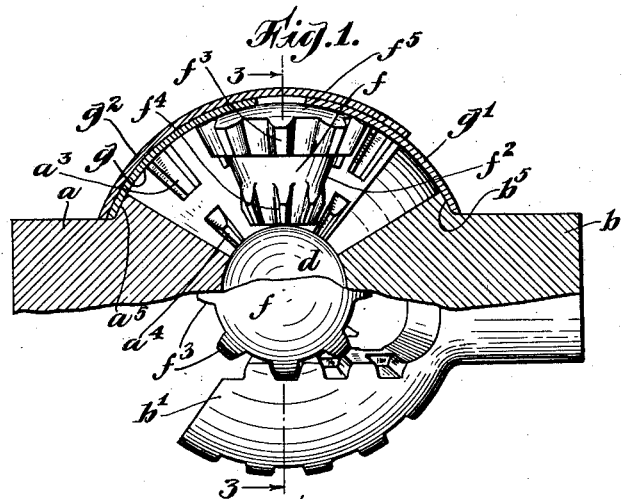
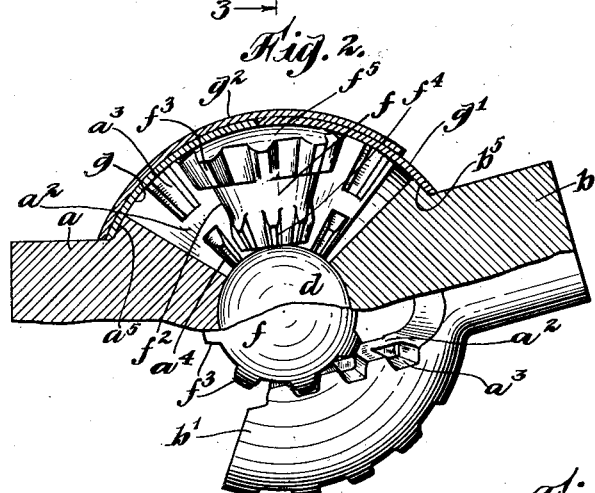
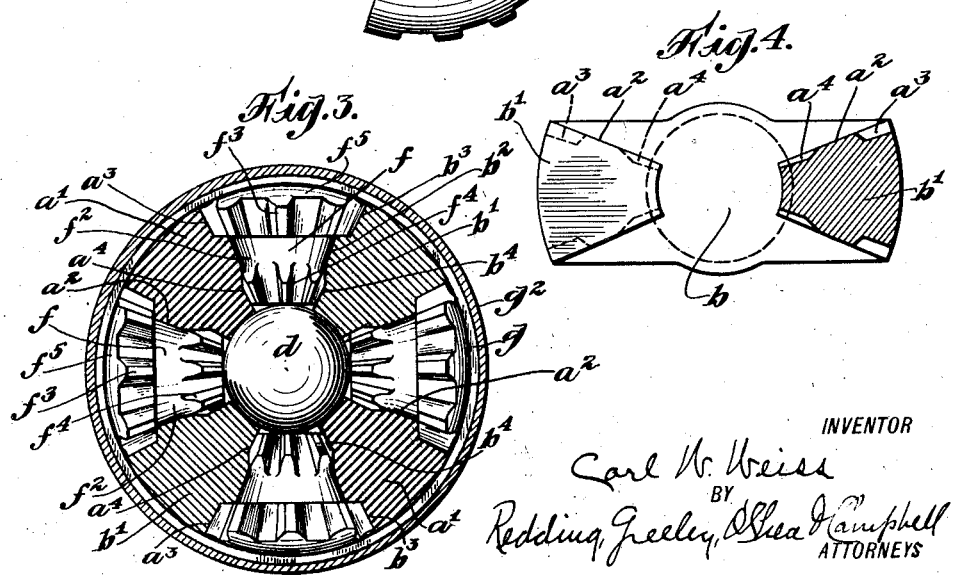

Patented Sept. 24, 1929

1,728,949

UNITED STATES PATENT OFFICE

CARL W. WEISS, OF BROOKLYN, NEW YORK

UNIVERSAL JOINT

Application filed April 26, 1927. Serial No. 186,663.

In Letters Patent of the United States No. 1,522,351, issued January 6, 1925, there is shown and described a form of universal joint in which the frictional losses are reduced and in which the angular velocity or speed of rotation of the driven member is the same as that of the driving member through such construction that the point of application of the force through which motion is transmitted from one member to the other shall be situated in a plane which bisects the angle of displacement of the axes of the two members. In the construction shown in that patent the proximate faces of the coacting portions of the two members are formed with non-concentric grooves with their longitudinal axes intersecting at an angle and a relatively movable body is received partly in each of such grooves, the force being transmitted from one coacting portion to the other through such body. The form of universal joint now to be described serves the same general purposes and functions in a somewhat similar manner, the force being transmitted from the coacting portion of one member to the corresponding portion of the other member through a relatively movable body, the axis of which stands always in a plane which bisects the angle of displacement of the two members whatever that angle may be. In the construction now to be described, a rolling body is interposed between the proximate faces of the coacting portions of the two members of the joint, but such body is conical in shape, has a rolling contact with the proximate faces of such coacting portions and is floating, that is, is unattached to any other part of the joint so that it shall be free to change its position as required in the angular displacement of the members of the joint in order that its axis shall always bisect the angle of displacement, provision being made for such engagement of the movable body with the coacting portions of the two members as shall prevent such displacement of the movable body as might cause the joint to be jammed.

The invention will be more fully explained hereinafter with reference to the accompanying drawing in which it is illustrated and in which:

Figure 1 is a view partly in elevation and partly in longitudinal section of a universal joint which embodies the invention, the two members of the joint being shown as aligned and the housing being omitted from the lower part of the figure.

Figure 2 is a similar view, but with the two members of the joint shown as displaced angularly with respect to each other.

Figure 3 is a view in transverse section through the axis of the joint, with the rolling bodies in elevation.

Figure 4 is a view in end elevation of one of the members of the joint, partly in section.

In the embodiment of the invention illustrated in the drawing, the driving member $a$ is shown as formed with two jaws or projections $a'$ with radial faces and designed to coact with corresponding portions $b'$ of the driven member $b$. The two members $a$ and $b$ are held from displacement toward each other by a spherical abutment $d$ to which the ends of the members are conformed. The adjacent faces of the coacting portions $a'$, $b'$ are not in contact or close proximity, as in the construction shown in said patent, but are spaced apart enough to receive between them a conical, rolling body $f$, adapted to roll on the adjacent radial faces of the coacting portions and having its sides directed toward the common axis of the joint. The conical, rolling body $f$ is floating, that is, it is unattached to any other part of the joint and is therefore free to change its position as required in the angular displacement of the members of the joint in order that its axis shall always bisect the angle of displacement of such members. Means now to be described are provided, however, for such engagement of the movable body with the coacting portions of the two members as shall prevent such displacement of the movable body as might cause the joint to be jammed. In the construction shown each jaw or coacting portion $a'$, $b'$ is formed on its coacting face with a track or raceway $a^2$, $b^2$ on which the conical member rolls, it being formed with an intermediate, smoothly conical portion $f^2$ for such rolling contact. The conical bodies $f$ should maintain always a truly median position with respect to the axes of the two members $a$ and $b$, whether the same are in line, as shown in Figure 1, or are displaced angularly, as shown in Figure 2, in order that the axis of the rolling body shall always bisect the angle of displacement of the two members. If the rolling bodies were smoothly conical throughout their length they might slip out of such median position in the operation of the joint, even if they had been properly placed in assembling the joint, and in order to prevent such possible displacement of the movable conical bodies they are formed with radial teeth, as at $f^3$, $f^4$, and the adjacent faces of the coacting portions $a'$, $b'$ are similarly formed with radial teeth $a^3$, $b^3$ and $a^4$, $b^4$, for engagement with the teeth of the conical rolling bodies, so that the conical rolling bodies shall remain always in the truly median position when the bearing has been assembled, notwithstanding the relative angular displacement of the two members.

The outer ends of the rolling bodies are made spherical in form, as shown at $f^5$.

As already stated, the two members of the joint are held from displacement toward each other by the spherical abutment $d$. They are held from displacement away from each other by a spherical housing made up of three annular sections $g$, $g'$ and $g^2$. Each section $g$, $g'$ is slipped upon the corresponding joint member $a$, $b$ against the shoulder $a^5$, $b^5$ formed to receive it. As shown clearly in Figure 1, these two members of the housing hold the movable, rolling bodies $f$ in place radially. When the two members of the joint are aligned, as in Figure 1, these two housing members do not meet, being spaced at their edges sufficiently to permit the two members $a$ and $b$ to be displaced angularly to the desired extent. The two housing members $g$, $g'$, and through them the joint members $a$ and $b$ are held from displacement away from each other by the third member $g^2$ of the housing which, when the other parts of the joint have been assembled, is crimped upon the housing members $g$, $g'$ in a suitable press.

In assembling the joint, the two members are brought in alignment against the spherical abutment $d$, with the housing members $g$, $g'$ drawn back. The conical rolling members $f$ are then dropped into place and the housing members $g$, $g'$ are moved against the shoulders $a^5$, $b^5$, thereby holding the conical members $f$ in place. Finally the housing member $g^2$ is crimped in place, thereby holding all parts of the joint together.

I claim as my invention:

1. A universal joint having two members capable of relative angular displacement and having coacting portions with their proximate radial faces spaced apart, and a floating conical rolling body interposed between such coacting portions, the proximate faces of the coacting portions and the conical rolling body being formed with radial teeth to prevent displacement of said body.

2. A universal joint having two members capable of relative angular displacement and having coacting portions with their proximate radial faces spaced apart, and a floating, conical rolling body interposed between such coacting portions, the proximate faces of the coacting portions and the conical rolling body being formed with radial teeth to prevent displacement of said body and respectively with a raceway and a smoothly conical portion for rolling contact.

3. A universal joint having two members capable of relative angular displacement and having coacting portions with their proximate radial faces spaced apart, a floating, conical rolling body, interposed between such coacting portions, the proximate faces of the coacting portions and the conical rolling body being formed with radial teeth to prevent displacement of said body, and a housing to hold the parts together.

This specification signed this 20th day of April A. D. 1927.

CARL W. WEISS.